US012444848B2

(12) United States Patent
Hsu et al.

(10) Patent No.: US 12,444,848 B2
(45) Date of Patent: Oct. 14, 2025

(54) ELECTRONIC DEVICE

(71) Applicant: Advanced Semiconductor Engineering, Inc., Kaohsiung (TW)

(72) Inventors: Shao-En Hsu, Kaohsiung (TW); Huei-Shyong Cho, Kaohsiung (TW); Shih-Wen Lu, Kaohsiung (TW)

(73) Assignee: ADVANCED SEMICONDUCTOR ENGINEERING, INC., Kaohsiung (TW)

( * ) Notice: Subject to any disclaimer, the term of this patent is extended or adjusted under 35 U.S.C. 154(b) by 330 days.

(21) Appl. No.: 18/108,489

(22) Filed: Feb. 10, 2023

(65) Prior Publication Data

US 2024/0275060 A1 Aug. 15, 2024

(51) Int. Cl.
*H01Q 13/10* (2006.01)
*H01P 3/12* (2006.01)

(52) U.S. Cl.
CPC ............. *H01Q 13/10* (2013.01); *H01P 3/121* (2013.01)

(58) Field of Classification Search
CPC .......... H01Q 13/10; H01Q 1/22; H01Q 1/273; H01Q 1/50; H01P 3/121; H05K 7/026
See application file for complete search history.

(56) References Cited

U.S. PATENT DOCUMENTS

2012/0093041 A1 4/2012 Takeda et al.
2021/0408655 A1 12/2021 Prabhu Gaunkar et al.
2022/0336384 A1 10/2022 Chen et al.

FOREIGN PATENT DOCUMENTS

CN 110931941 A 3/2020
CN 113615004 A * 11/2021 ............. H01Q 1/246
CN 115579636 A * 1/2023

OTHER PUBLICATIONS

Translation of CN 115579636 A (Year: 2023).*
Translation of CN 113615004 A (Year: 2021).*
Non-Final Office Action on U.S. Appl. No. 18/108,498 DTD Dec. 19, 2024.

* cited by examiner

*Primary Examiner* — Renan Luque
(74) *Attorney, Agent, or Firm* — FOLEY & LARDNER LLP

(57) ABSTRACT

The present disclosure provides an electronic device. The electronic device includes a signal transmission structure and a circuit. The signal transmission structure defines a waveguide. The signal transmission structure defines a plurality of first apertures. The circuit is configured to adjust a geometric profile of at least one of the plurality of first apertures to control a frequency of an electromagnetic wave radiated from the first apertures.

9 Claims, 13 Drawing Sheets

ELECTRONIC DEVICE

BACKGROUND

1. Field of the Disclosure

The present disclosure generally relates to an electronic device, in particular to an electronic device including an adjustable waveguide.

2. Description of the Related Art

To reduce the size electronic device packages and achieve higher integration density, several packaging solutions have been developed and implemented, such as antenna in package (AiP), antenna on package (AoP), and substrate integrated waveguide (SIW) antenna.

However, to support the industry's demand for increased functionality, the size electronic device packages will inevitably be increased, and some applications may be limited (e.g., in portable devices).

SUMMARY

In some embodiments, an electronic device includes a signal transmission structure and a circuit. The signal transmission structure defines a waveguide. The signal transmission structure defines a plurality of first apertures. The circuit is configured to adjust a geometric profile of at least one of the plurality of first apertures to control a frequency of an electromagnetic wave radiated from the first apertures.

In some embodiments, an electronic device includes a signal transmission structure and a circuit. The signal transmission structure has a waveguide and a plurality of first slots configured to radiate an electromagnetic wave. Each of the plurality of first slots is adjustable by a circuit to control a radiation direction of the electromagnetic wave.

In some embodiments, an electronic device includes a signal transmission structure and a circuit. The signal transmission structure has a waveguide and a plurality of first slots. The circuit is configured to control a distance between abutting two of a plurality of first slots. The plurality of first slots are configured to radiate a first electromagnetic waves forming a first constructive interference.

BRIEF DESCRIPTION OF THE DRAWINGS

Aspects of some embodiments of the present disclosure are best understood from the following detailed description when read with the accompanying figures. It is noted that various structures may not be drawn to scale, and dimensions of the various structures may be arbitrarily increased or reduced for clarity of discussion.

Figure 1A:
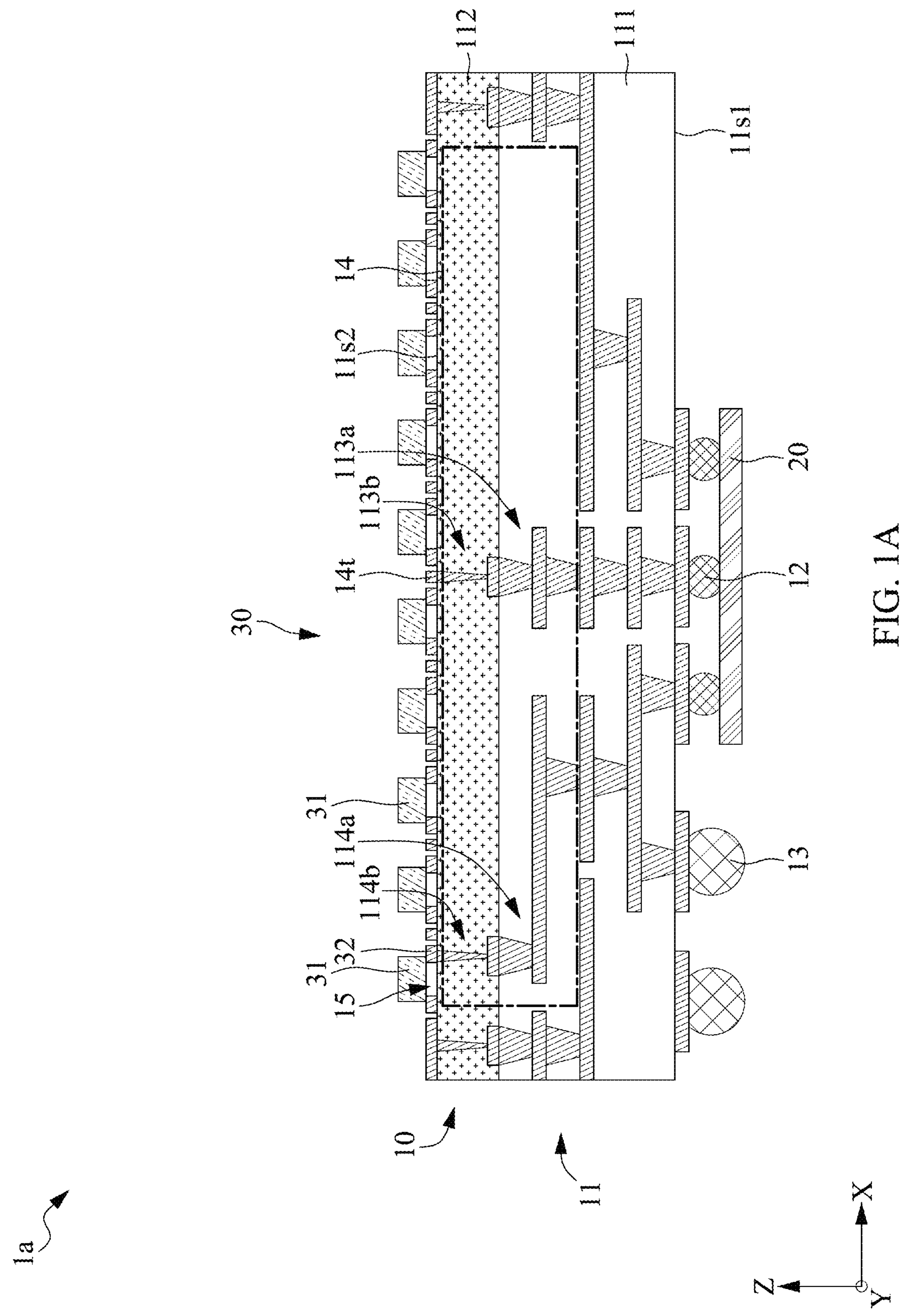
FIG. 1A is a cross-sectional view of an electronic device, in accordance with an embodiment of the present disclosure.

Common reference numerals are used throughout the drawings and the detailed description to indicate the same or similar components. The present disclosure will be more apparent from the following detailed description taken in conjunction with the accompanying drawings.

DETAILED DESCRIPTION

The following disclosure provides many different arrangements, or examples, for implementing different features of the provided subject matter. Specific examples of components and arrangements are described as follows. These are, of course, merely examples and are not intended to be limiting. In the present disclosure, reference to the formation or disposal of a first feature over or on a second feature in the description that follows may include arrangements in which the first and second features are formed or disposed in direct contact, and may also include arrangements in which one or more additional features may be formed or disposed between the first and second features, such that the first and second features may not be in direct contact. In addition, the present disclosure may repeat reference numerals and/or letters in the various examples. The same reference numerals and/or letters refer to the same or similar parts. This repetition is for the purpose of simplicity and clarity and does not in itself dictate a relationship between the various arrangements and/or configurations.

Arrangements of the present disclosure are discussed in detail as follows. It should be appreciated, however, that the present disclosure provides many applicable concepts that can be embodied in a wide variety of specific contexts. The specific arrangements discussed are merely illustrative and do not limit the scope of the disclosure.

FIG. 1A is a cross-sectional view of an electronic device 1*a,* in accordance with an embodiment of the present disclosure. In some embodiments, the electronic device 1*a* may be applicable to, for example, a wireless device, such as user equipment (UE), a mobile station, a mobile device, an apparatus communicating with the Internet of Things (IoT), etc. In some embodiments, the electronic device la may be or include a portable device. In some embodiments, the electronic device la may support fifth generation (5G) communications, such as sub-6 GHz frequency bands and/or millimeter (mm) wave frequency bands. For example, the electronic device la may incorporate both sub-6 GHz devices and mm wave devices. In some embodiments, the electronic device 1*a* may support beyond-5G or 6G communications, such as terahertz (THz) frequency.

In some embodiments, the electronic device 1*a* may include a signal transmission structure 10, an electronic component 20, and a circuit 30.

The signal transmission structure 10 may be configured to radiate and/or receive electromagnetic signals, such as radio frequency (RF) signals. For example, the signal transmission structure 10 may be configured to operate in a frequency between about 10 GHz and about 10 THz, such as 10 GHz, 20 GHz, 30 GHz, 40 GHZ, 50 GHZ, 100 GHz, 300 GHz, 1 THz, 5 THz, or 10 THz. In some embodiments, the signal transmission structure 10 may include a carrier 11, electrical connections 12 and 13, as well as a waveguide 14.

The carrier 11 may be or include, for example, a substrate. In some embodiments, the carrier 11 may include, for example, a printed circuit board (PCB), such as a paper-based copper foil laminate, a composite copper foil laminate, or a polymer-impregnated glass-fiber-based copper foil laminate. The carrier 11 may have a surface 11*s*1 (or a lower surface) and a surface 11*s*2 (or an upper surface) opposite to the surface 11*s*1. In some embodiments, the carrier 11 may include a dielectric structure 111 and a dielectric structure 112.

In some embodiments, the dielectric structure 111 may include a plurality of dielectric layers. In some embodiments, the dielectric structure 112 may include at least one dielectric layer. The material(s) of the dielectric layer of the dielectric structure 111 may be different from that of the dielectric structure 112. In some embodiments, a dielectric constant (dk) of the dielectric layer of the dielectric structure 111 may be different from that of the dielectric structure 112. In some embodiments, the dk of the dielectric layer of the dielectric structure 111 may be less than that of the dielectric structure 112. In some embodiments, the material of the dielectric structure 111 may include, for example, polypropylene (PP) or other suitable materials. In some embodiments, the material of the dielectric structure 112 may include, for example, polyimide (PI) or other suitable materials. In some embodiments, the number of the dielectric layers of the dielectric structure 111 may be different from that of the dielectric structure 112. In some embodiments, the number of the dielectric layers of the dielectric structure 111 may be greater than that of the dielectric structure 112.

In some embodiments, the electronic device 1*a* may include redistribution structures 113*a*, 113*b*, 114*a*, and 114*b*. Each of the redistribution structures 113*a*, 113*b*, 114*a*, and 114*b* may include conductive pad(s), trace(s), via(s), layer(s), or other interconnection(s).

The redistribution structure 113*a* may be disposed within the dielectric structure 111. In some embodiments, the redistribution structure 113*a* may be configured to electrically connect the electronic component 20 and a conductive pattern 14*t* of the waveguide 14. In some embodiments, the redistribution structure 113*a* may include a stacked conductive structure, which may include multiple conductive layers, conductive traces and/or conductive vias at different levels. In some embodiments, at least a portion of the redistribution structure 113*a* may serve as a part of an electromagnetic resonator of the waveguide 14. In some embodiments, at least a portion of the redistribution structure 113*a* may serve as a sidewall of the waveguide 14. In some embodiments, at least a portion of the stacked conductive structure of the redistribution structure 113*a* may serve as a sidewall of the waveguide 14. In some embodiments, the redistribution structure 113*a* may be electrically connected to ground.

The redistribution structure 113*b* may be disposed within the dielectric structure 112. In some embodiments, the redistribution structure 113*b* may be configured to electrically connect the electronic component 20 and the conductive pattern 14*t* of the waveguide 14. In some embodiments, the redistribution structure 113*b* may include at least a conductive trace and at least a conductive via. In some embodiments, at least a portion of the redistribution structure 113*b* may serve as a part of an electromagnetic resonator of the waveguide 14. In some embodiments, at least a portion of the redistribution structure 113*b* may serve as a sidewall of the waveguide 14. In some embodiments, the redistribution structure 113*b* may be electrically connected to ground.

In some embodiments, a dimension (e.g., line width, line length, or line aperture) of the redistribution structure 113*b* may be less than that of the redistribution structure 113*a*. In some embodiments, the density of the redistribution structure 113*b* may be greater than that of the redistribution structure 113*a*. In this disclosure, the "density" of a conductive structure (e.g., conductive pad, trace, via, layer, or other interconnections) may be proportional to the number of conductive pads, traces, vias, or layers which are separated from each other per unit area. In this disclosure, the density of a conductive structure may be inversely proportional to a pitch of the conductive structure. In this disclosure, the density of a conductive structure may be inversely proportional to a minimum distance of two abutting conductive pads, traces, vias, or layers of the conductive structure.

The redistribution structure 114*a* may be disposed within the dielectric structure 111. In some embodiments, the redistribution structure 114*a* may be configured to electrically connect the electronic component 20 and the circuit 30. In some embodiments, the redistribution structure 114*a* may be configured to receive a signal to turn on or turn off switch element 31.

The redistribution structure 114*b* may be disposed within the dielectric structure 112. In some embodiments, the redistribution structure 114*b* may be configured to electrically connect the electronic component 20 and the circuit 30. In some embodiments, the redistribution structure 114*b* may be configured to receive a signal to turn on or turn off the switch element 31.

In some embodiments, a dimension (e.g., line width, line length, or line aperture) of the redistribution structure 114*b* may be less than that of the redistribution structure 114*a*. In some embodiments, a dimension (e.g., line width, line length, or line aperture) of the redistribution structure 114*b* may be substantially equal to that of the redistribution structure 113*b*. In some embodiments, a dimension (e.g., line width, line length, or line aperture) of the redistribution structure 114*a* may be substantially equal to that of the redistribution structure 113*a*.

In some embodiments, the density of the redistribution structure 114*b* may be greater than that of the redistribution structure 114*a*. In some embodiments, the density of the redistribution structure 114*b* may be substantially equal to that of the redistribution structure 113*b*. In some embodiments, the density of the redistribution structure 114*a* may be substantially equal to that of the redistribution structure 113*a*.

The carrier 11 may further include one or more transmission lines (e.g., communications cables) and one or more grounding lines and/or grounding planes in proximity to, adjacent to, or embedded in and exposed at the surface 11*s*1 and/or surface 11*s*2 of the carrier 11.

In some embodiments, the electrical connection 12 may be disposed over the surface 11*s*1 of the carrier 11. In some embodiments, the electrical connection 12 may be configured to electrically or signally connect the electronic component 20 and the carrier 11. In some embodiments, the electrical connection 12 may be configured to electrically or signally connect the electronic component 20 and the waveguide 14. In some embodiments, the electrical connection 12 may be configured to electrically or signally connect the electronic component 20 and the circuit 30. In some embodiments, the electrical connection 12 may include, for example, a solder material, such as alloys of gold and tin solder or alloys of silver and tin solder.

In some embodiments, the electrical connection 13 may be disposed over the surface 11$s$1 of the carrier 11. In some embodiments, the electrical connection 13 may be configured to electrically or signally connect an external device (not shown) and the waveguide 14. In some embodiments, the electrical connection 13 may be configured to electrically or signally connect an external device and the circuit 30. In some embodiments, the electrical connection 13 may include, for example, a solder material, such as alloys of gold and tin solder or alloys of silver and tin solder.

In some embodiments, the waveguide 14 may be configured to radiate an electromagnetic wave, such as an RF signal. In some embodiments, the waveguide 14 may define an electromagnetic resonator as the framed region shown in FIG. 1A. In some embodiments, the waveguide 14 may include or be made of a conductive structure, such as copper (Cu), tungsten (W), ruthenium (Ru), iridium (Ir), nickel (Ni), osmium (Os), ruthenium (Rh), aluminum (Al), molybdenum (Mo), cobalt (Co), alloys thereof, combinations thereof or any metallic materials.

In some embodiments, the waveguide 14 may include a slot waveguide antenna. In some embodiments, the waveguide 14 may include the conductive pattern 14$t$. In some embodiments, the conductive pattern 14$t$ may be disposed over the surface 11$s$2 of the carrier 11. In some embodiments, the conductive pattern 14$t$ may be electrically connected to the redistribution structure 113$a$. In some embodiments, the conductive pattern 14$t$ may be electrically connected to the redistribution structure 113$b$. In some embodiments, the waveguide 14 may define or include a plurality of slots 15. In some embodiments, the conductive pattern 14$t$ may define a plurality of slots 15. In some embodiments, a portion of the dielectric structure 112 may be exposed from the slots 15. The slots 15 may serve as a part of an electromagnetic resonator, which results in equivalent surface magnetic currents along or across the slots 15. In some embodiments, a portion of the redistribution structures 113$a$, 113$b$, and slots 15 may form an electromagnetic resonator.

The electronic component 20 may be adjacent to or disposed over the surface 11$s$1 of the carrier 11. The electronic component 20 may be electrically connected to one or more other electrical components (if any) and to the carrier 11 (e.g., to the interconnection(s)), and the electrical connection may be attained by way of flip-chip, wire-bond techniques, metal to metal bonding (such as Cu to Cu bonding), or hybrid bonding. The electronic component 20 may be a chip or a die including a semiconductor substrate, one or more integrated circuit (IC) devices and one or more overlying interconnection structures therein. The IC devices may include active devices such as transistors and/or passive devices such as resistors, capacitors, inductors, or a combination thereof. For example, the electronic component 20 may include a system on chip (SoC). For example, the electronic component 20 may include a radio frequency integrated circuit (RFIC), an application-specific IC (ASIC), a central processing unit (CPU), a microprocessor unit (MPU), a graphics processing unit (GPU), a microcontroller unit (MCU), a field-programmable gate array (FPGA), or another type of IC. In some embodiments, the electronic component 20 may be configured to provide the waveguide 14 with a signal (e.g., a feed signal). In some embodiments, the circuit 30 may be configured to drive at least one of slots 15 operating in an On or Off mode. In some embodiments, the circuit 30 may be configured to control, modify, and/or adjust the waveguide 14, as will be described later.

In some embodiments, the circuit 30 may be configured to switch at least one of the slots 15. In some embodiments, the circuit 30 may be configured to enable and/or disable at least one of the slots 15. For example, if one of the slots 15 is disabled, the said slot 15 cannot function as a part of an electromagnetic resonator, which results in a change of a radiation pattern, a frequency, a bandwidth, or a phase of an electromagnetic wave. The change of the radiation pattern may be involved in, but is not limited to, a change of transmission direction, angle, and/or an intensity distribution of an electromagnetic wave. In some embodiments, the circuit 30 may include switch elements 31 and a conductive structure 32.

In some embodiments, the switch element 31 may be disposed over the surface 11$s$2 of the carrier 11. In some embodiments, the switch element 31 may be disposed across a corresponding one of the slots 15. In some embodiments, the switch element 31 may cover a corresponding one of the slots 15. For example, a first terminal (not annotated) of the switch element 31 may be disposed at a first side of one of the slots 15, and a second terminal (not annotated) of the switch element 31 may be disposed at a second side, which is opposite to the first side, of the one of the slots 15. In some embodiments, the switch element 31 may be configured to control, modify, and/or adjust an electromagnetic wave, including radiation pattern and/or frequency, radiated from the signal transmission structure 10. In some embodiments, the switch element 31 may be configured to enable and/or disable the slot 15 to function as a part of an electromagnetic resonator. In some embodiments, the switch element 31 may include a diode(s), a transistor(s), or other suitable switches.

In some embodiments, the conductive structure 32 may be disposed over the surface 11$s$2 of the carrier 11. The conductive structure 32 may support the switch element 31. The conductive structure 32 may be configured to electrically connect the switch element 31 and the carrier 11. In some embodiments, the conductive structure 32 may be configured to turn on and/or turn off the switch element 31. In some embodiments, the conductive pattern 14$t$ of the waveguide 14 and the conductive structure 32 may be located at the same elevation. In some embodiments, the conductive pattern 14$t$ of the waveguide 14 may be level with the conductive structure 32. In some embodiments, the conductive structure 32 may be electrically connected to the redistribution structure 114$a$. In some embodiments, the conductive structure 32 may be electrically connected to the redistribution structure 114$b$.

Figure 1B:
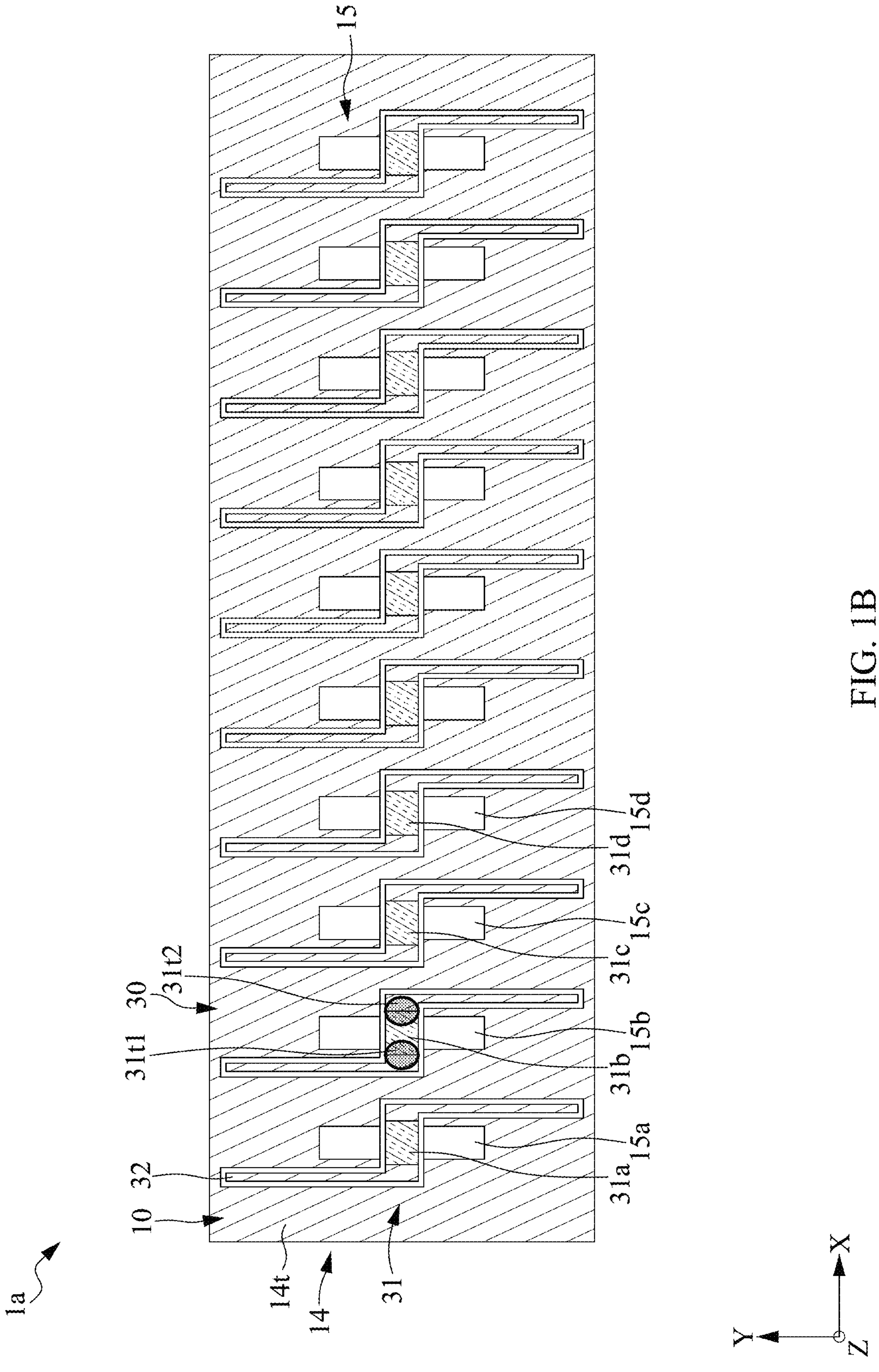
FIG. 1B is a top view of the electronic device as shown in FIG. 1A, in accordance with an embodiment of the present disclosure.

FIG. 1B is a top view of the electronic device la as shown in FIG. 1A, in accordance with an embodiment of the present disclosure.

In some embodiments, the slots 15 may be arranged along the X direction. For example, the slots 15 may include slots 15$a$, 15$b$, 15$c$, and 15$d$ aligned along the X direction.

The switch element 31 may include switch elements 31$a$, 31$b$, 31$c$, and 31$d$ aligned along the X direction. Each of the switch elements 31*a,* 31*b,* 31*c,* and 31*d* may be disposed across the corresponding slots 15*a,* 15*b,* 15*c,* and 15*d,* respectively.

In some embodiments, the conductive structure 32 may be spaced apart from the conductive pattern 14*t* of the waveguide 14, and connected two terminals 31*t*1 and 31*t*2 of the switch element 31.

In some embodiments, each of the slots 15 may be enabled or disabled independently by an operation of a corresponding switch element 31. For example, when the switch element 31*a* is in the on condition, the slot 15*a* may be disabled; when the switch element 31*b* is in the off condition, the slot 15*b* may be enabled or remain enabled. When a switch element 31 is turned on, the corresponding slot 15 is in an Off mode. When a switch element 31 is turned off, the corresponding slot 15 is in an On mode. For example, when the switch element 31*a* is turned on, the slot 15*a* is in an Off mode and cannot function as a part of an electromagnetic resonator of the waveguide 14. When the switch element 31*b* is turned off, the slot 15*b* is in an On mode and can function as a part of an electromagnetic resonator of the waveguide 14. By turning on and/or off the switch elements 31, the number of effective slots 15 enabled to function as an electromagnetic resonator may be changed. As a result, the electromagnetic wave radiated from the signal transmission structure 10 may be controlled, changed, and/or modified.

In comparison with a conventional electronic device, the electronic device la includes switch elements 31 which may be configured to tune the electromagnetic wave promptly and effectively. Further, the carrier 11 includes redistribution structures with a high-density circuit structure (e.g., redistribution structures 113*b* and 114*b*) and a low-density circuit structure (e.g., redistribution structures 113*a* and 114*a*). The high-density redistribution structure may facilitate the switching of slots, which thereby improves the performance of the electronic device 1*a.* The low-density redistribution structure may reduce the transmission loss of an electromagnetic wave.

Figure 1C:
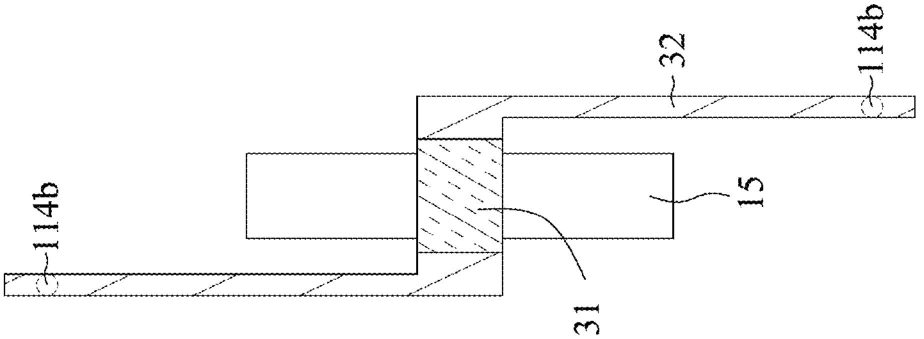
FIG. 1C is a partial enlarged view of the electronic device as shown in FIG. 1B, in accordance with an embodiment of the present disclosure.

FIG. 1C is a partial enlarged view of the electronic device la as shown in FIG. 1B, in accordance with an embodiment of the present disclosure.

In some embodiments, the conductive structure 32 may be electrically connected to the redistribution structure 114*b*. In some embodiments, a voltage may be applied to two terminals of the conductive structure 32 to determine the switch element 31 is in the on condition or in the off condition.

Figure 2A:
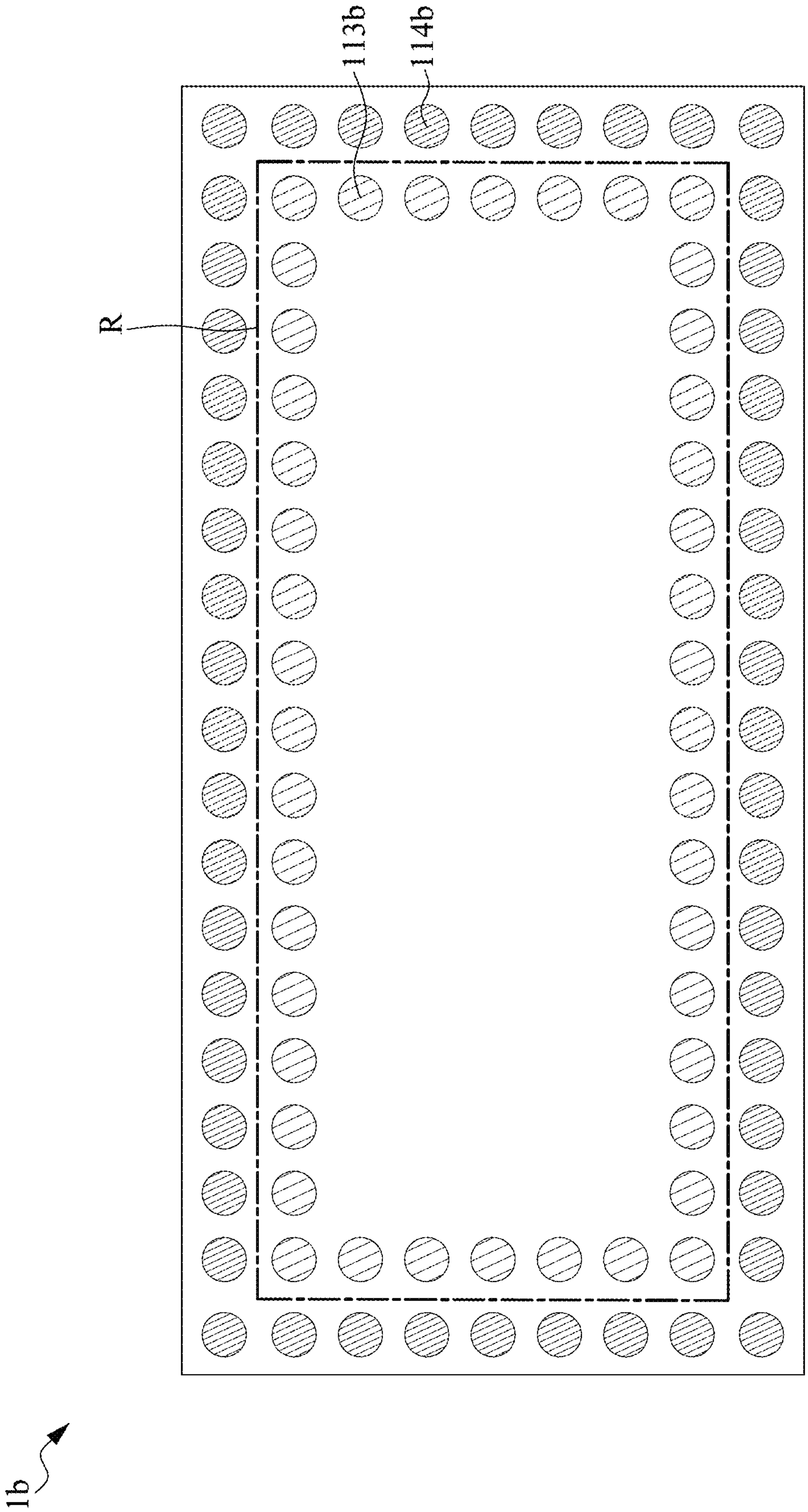
FIG. 2A is a schematic view of a layout of vias of an electronic device, in accordance with an embodiment of the present disclosure.
Figure 2B:
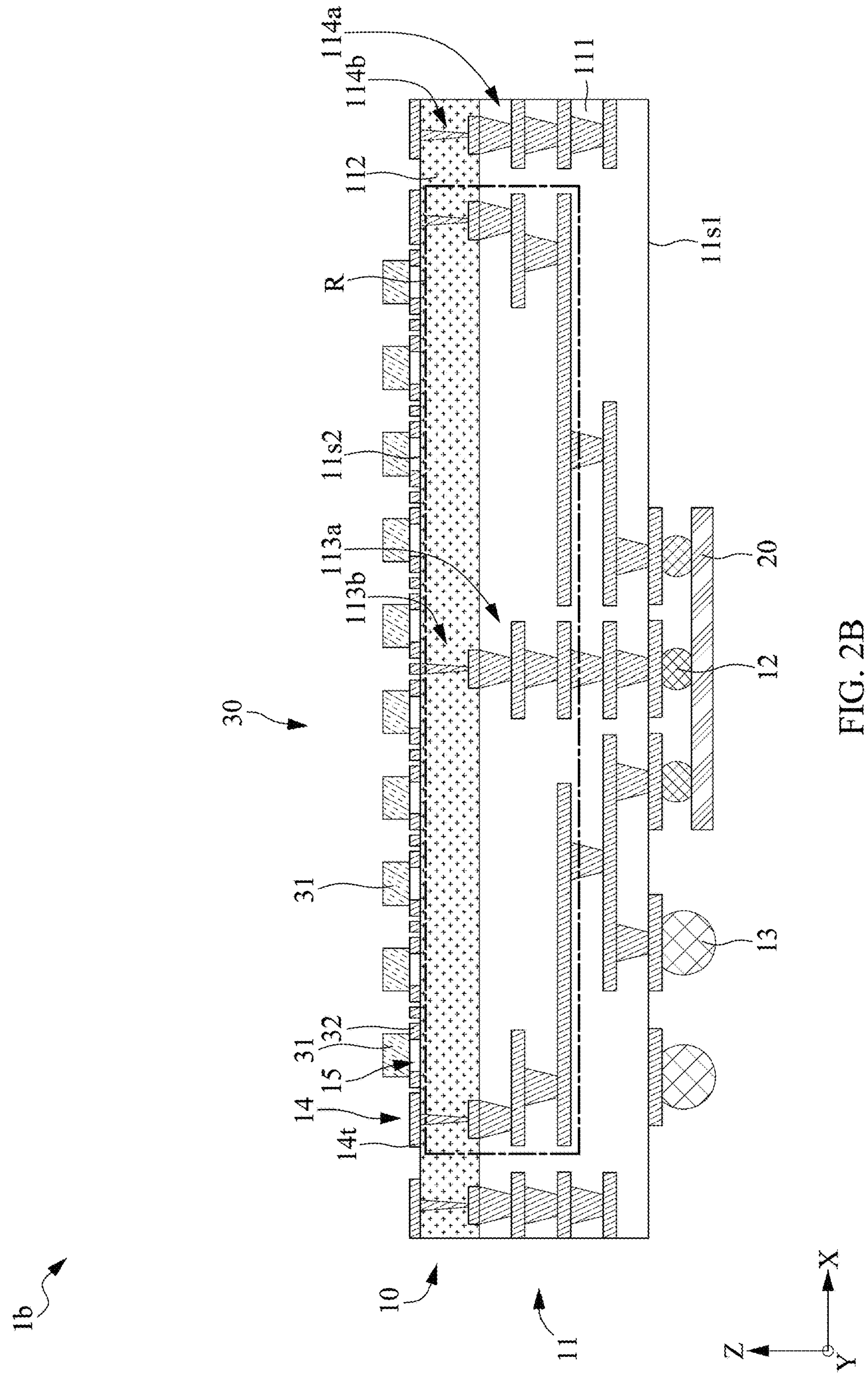
FIG. 2B is a cross-sectional view of an electronic device, in accordance with an embodiment of the present disclosure.

FIG. 2A is a schematic view of a layout of vias of an electronic device, in accordance with an embodiment of the present disclosure. FIG. 2B is a cross-sectional view of an electronic device 1*b,* in accordance with an embodiment of the present disclosure. The electronic device 1*b* is similar to the electronic device 1*a* as shown in FIG. 1A, and the differences therebetween are described below.

As shown in FIG. 2A, the conductive element serving the waveguide, such as the redistribution structure 113*b,* may be disposed within a region R. The conductive element connected to the switch element, such as the redistribution structure 114*b,* may be disposed beyond the region R. In some embodiments, the redistribution structure 113*b* (and/or 113*a*) may include ground vias electrically connected to ground. In some embodiments, the redistribution structure 114*b* (and/or 113*a*) may include signal vias configured to provide a signal to determine the switch element 31, as such shown in FIG. 2B, is turned on or turned off.

In some embodiments, the redistribution structure 114*a* may be disposed at a relatively peripheral region of the carrier 11. In some embodiments, the redistribution structure 113*a* may be disposed at a relatively central region of the carrier 11. In some embodiments, the redistribution structure 114*a* may surround or be around the redistribution structure 113*a.* In some embodiments, the redistribution structure 114*b* may be disposed at a relatively peripheral region of the carrier 11. In some embodiments, the redistribution structure 113*b* may be disposed at a relatively central region of the carrier 11. In some embodiments, the redistribution structure 114*b* may surround or be around the redistribution structure 113*b.* As shown in FIG. 2B, the region R may be configured to accommodate redistribution structures 113*a* and 113*b,* which may function as a sidewall of an electromagnetic resonator. In this embodiment, such design may prevent the electromagnetic wave radiated from the signal transmission structure 10 from being influenced by the operation of the switch element 31.

Figure 3:
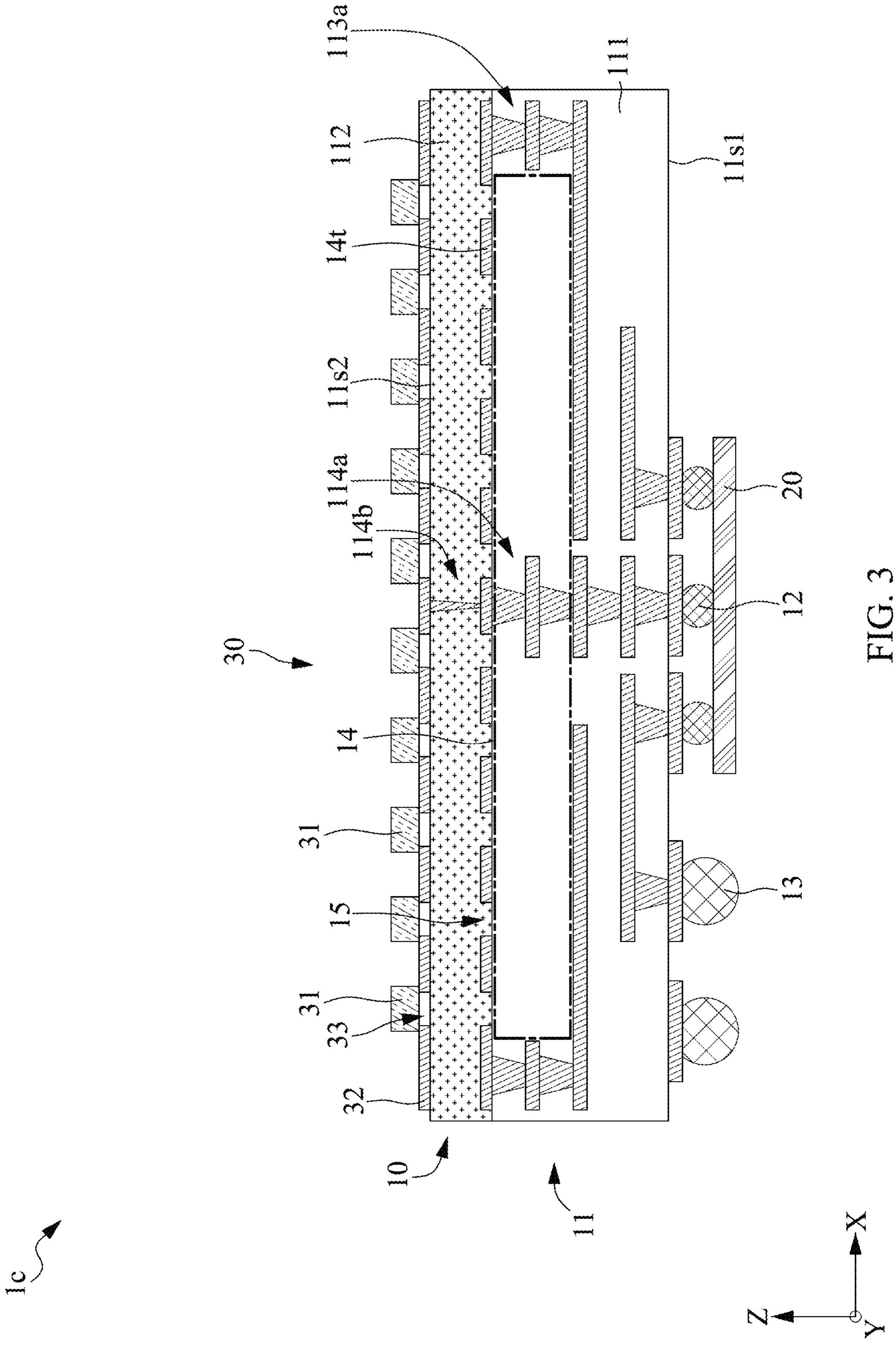
FIG. 3 is a cross-sectional view of an electronic device, in accordance with an embodiment of the present disclosure.

FIG. 3 is a cross-sectional view of an electronic device 1*c,* in accordance with an embodiment of the present disclosure. The electronic device 1*c* is similar to the electronic device 1*a* as shown in FIG. 1A, and the differences therebetween are described below.

In some embodiments, the waveguide 14 may be disposed within the carrier 11. In some embodiments, the conductive pattern 14*t* of the waveguide 14 may be disposed within the carrier 11. In some embodiments, the waveguide 14 may be disposed within the dielectric structure 112. In some embodiments, the conductive pattern 14*t* of the waveguide 14 may be disposed within the dielectric structure 112.

In some embodiments, the conductive structure 32 may be disposed over or above the waveguide 14. In some embodiments, the conductive structure 32 may be disposed over or above the conductive pattern 14*t* of the waveguide 14. In some embodiments, the conductive structure 32 and the conductive pattern 14*t* of the waveguide 14 may be located at different elevations or levels. In some embodiments, the conductive structure 32 may define the slots 33. In some embodiments, the slots 15 may be disposed between the waveguide 14 and the slots 33. In some embodiments, the switch element 31 may cover the slots 33. In some embodiments, the switch element 31 may be disposed across the slots 33. In some embodiments, each of the slots 33 may be aligned with one of the slots 15 along the Z direction. In some embodiments, each of the slots 33 may overlap one of the slots 15 along the Z direction. In this embodiment, such design may prevent the electromagnetic wave radiated from the signal transmission structure 10 from being influenced by the operation of the switch element 31.

Figure 4:
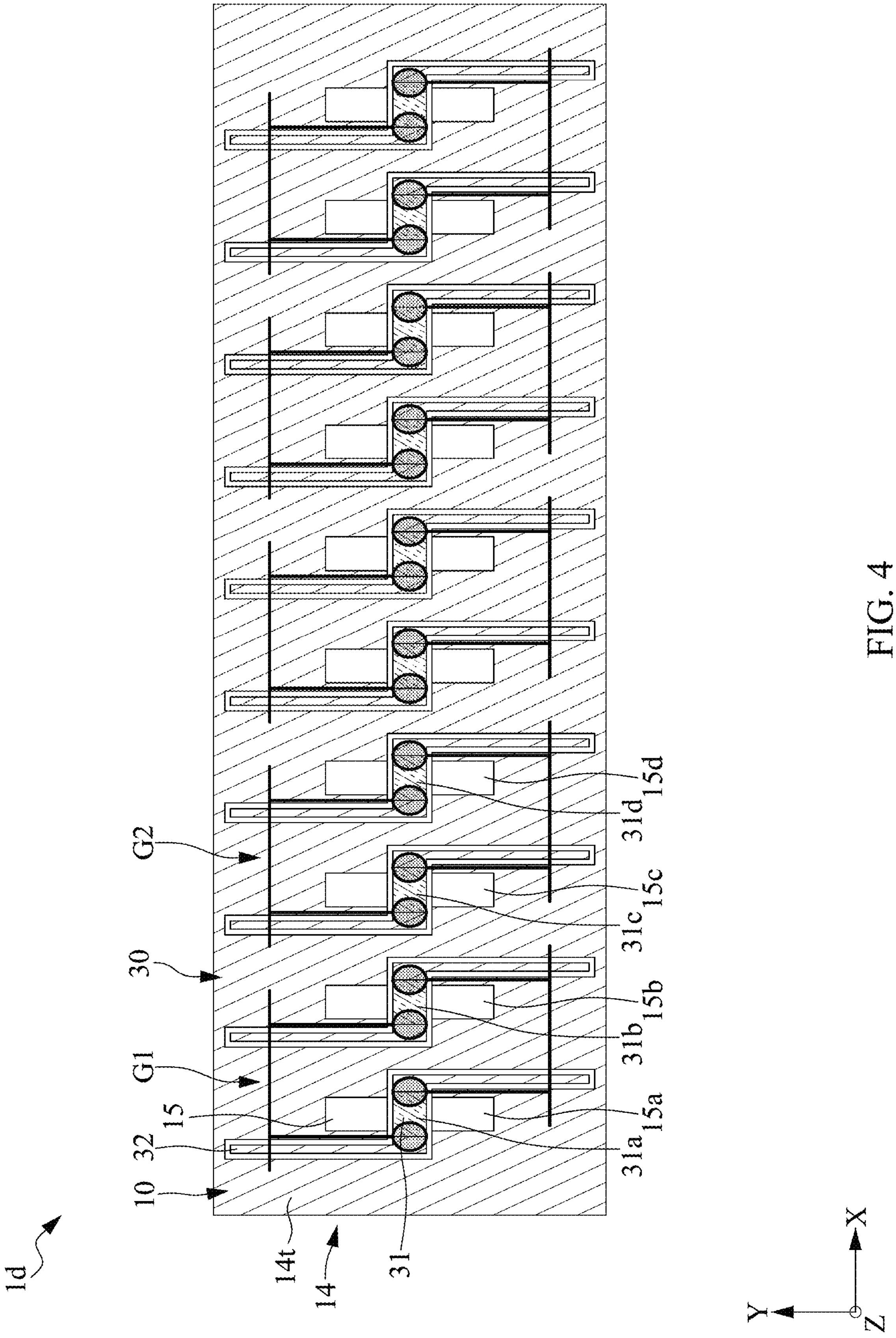
FIG. 4 is a top view of an electronic device, in accordance with an embodiment of the present disclosure.

FIG. 4 is a top view of an electronic device 1*d,* in accordance with an embodiment of the present disclosure. The electronic device 1*d* is similar to the electronic device 1*a* as shown in FIG. 1B, and the differences therebetween are described below.

In some embodiments, the switch elements 31 may be grouped so that some of switch elements 31 may be operated concurrently. For example, the switch elements 31 may include groups G1 and G2. The group G1 may include the switch elements 31*a* and 31*b*. The group G2 may include the switch elements 31*c* and 31*d.* A voltage may be applied to both the switch elements 31*a* and 31*b,* which thereby turns on both the switch elements 31*a* and 31*b* or turns off both the switch elements 31*a* and 31*b* concurrently. In some embodiments, the groups G1 and G2 may be switched independently. Since the switch elements 31*a* and 31*b* may be turned on or off concurrently, the switch elements 31*a* and 31*b* may share a common conductive structure, which may reduce the quantity of the redistribution structures (e.g., redistribution structures 114_a_ and 114_b_ as shown in FIG. 1A) and facilitate miniaturization of the electronic device 1_d_.

Figure 5:
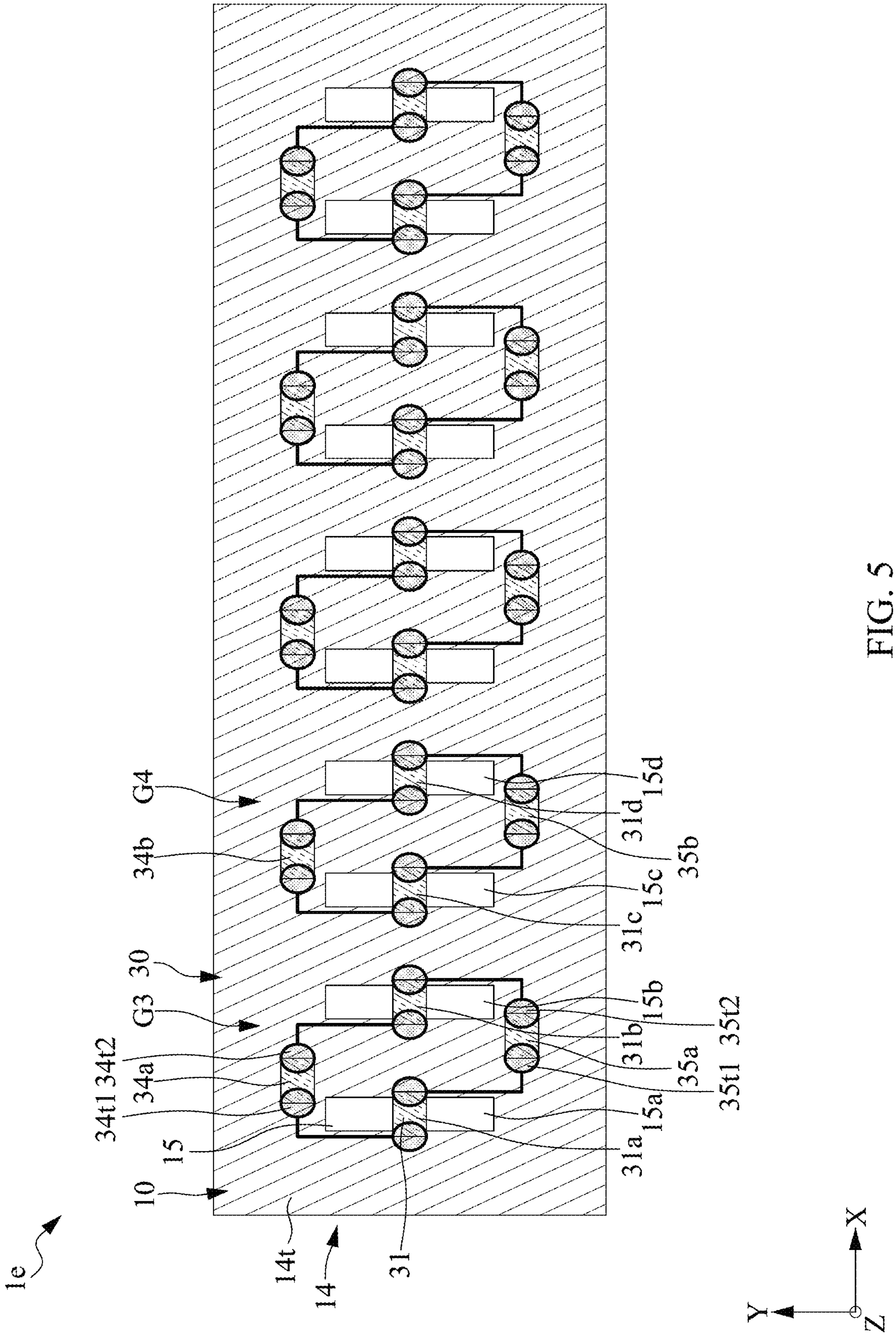
FIG. 5 is a top view of an electronic device, in accordance with an embodiment of the present disclosure.

FIG. 5 is a top view of an electronic device 1_e_, in accordance with an embodiment of the present disclosure. The electronic device 1_e_ is similar to the electronic device 1_a_ as shown in FIG. 1B, and the differences therebetween are described below. It should be noted that some elements, such as the conductive structure 32 as shown in FIG. 1B, are omitted for brevity.

In some embodiments, the switch elements 31 may be grouped. For example, the switch elements 31 may include groups G3 and G4, which may be switched independently. In some embodiments, the switch element 31 may include additional switch elements 34_a_, 34_b_, 35_a_, and 35_b_. The group G3 may include the switch elements 31_a_, 31_b_, 34_a_, and 35_a_. The group G4 may include the switch elements 31_c_, 31_d_, 34_b_, and 35_b_. In some embodiments, each of the switches 34_a_, 34_b_, 35_a_, and 35_b_ may include a diode(s), a transistor(s), or other suitable switches.

In some embodiments, the switch 34_a_ may be electrically or signally coupled with the switch elements 31_a_ and 31_b_. In some embodiments, the switch 34_a_ may be electrically or signally coupled between the switch elements 31_a_ and 31_b_. In some embodiments, the switch 35_a_ may be electrically or signally coupled with the switch elements 31_a_ and 31_b_. In some embodiments, the switch 35_a_ may be electrically or signally coupled between the switch elements 31_a_ and 31_b_. In some embodiments, the first terminal (not annotated) of the switch element 31_a_ may be electrically or signally coupled to a first terminal 34_t_1 of the switch 34_a_. In some embodiments, the first terminal of the switch element 31_b_ may be electrically or signally coupled to a second terminal 34_t_2 of the switch 34_a_. In some embodiments, the second terminal of the switch element 31_a_ may be electrically or signally coupled to a first terminal 35_t_1 of the switch 35_a_. In some embodiments, the second terminal of the switch element 31_b_ may be electrically or signally coupled to a second terminal 35_t_2 of the switch 35_a_. In some embodiments, each of the switch elements 34_a_, 34_b_, 35_a_, and 35_b_ may be regarded as a control element. When the switch element 31_a_ is turned on by the switch element 34_a_, the switch element 31_b_ is turned off by the switch element 34_a_.

In some embodiments, the switches 34_a_ and 35_a_ may be collectively configured to turn on and/or turn off the switch element 31_a_ and/or 31_b_. In some embodiments, the switches 34_b_ and 35_b_ may be collectively configured to turn on and/or turn off the switch element 31_c_ and/or 31_d_. In this embodiment, the switch elements 31_a_ and 31_b_ (or switch elements 31_c_ and 31_d_) may share a conductive structure, which may reduce the quantity of the redistribution structures (e.g., redistribution structures 114_a_ and 114_b_ as shown in FIG. 1A) and facilitate miniaturization of the electronic device 1_e_.

Figure 6A:
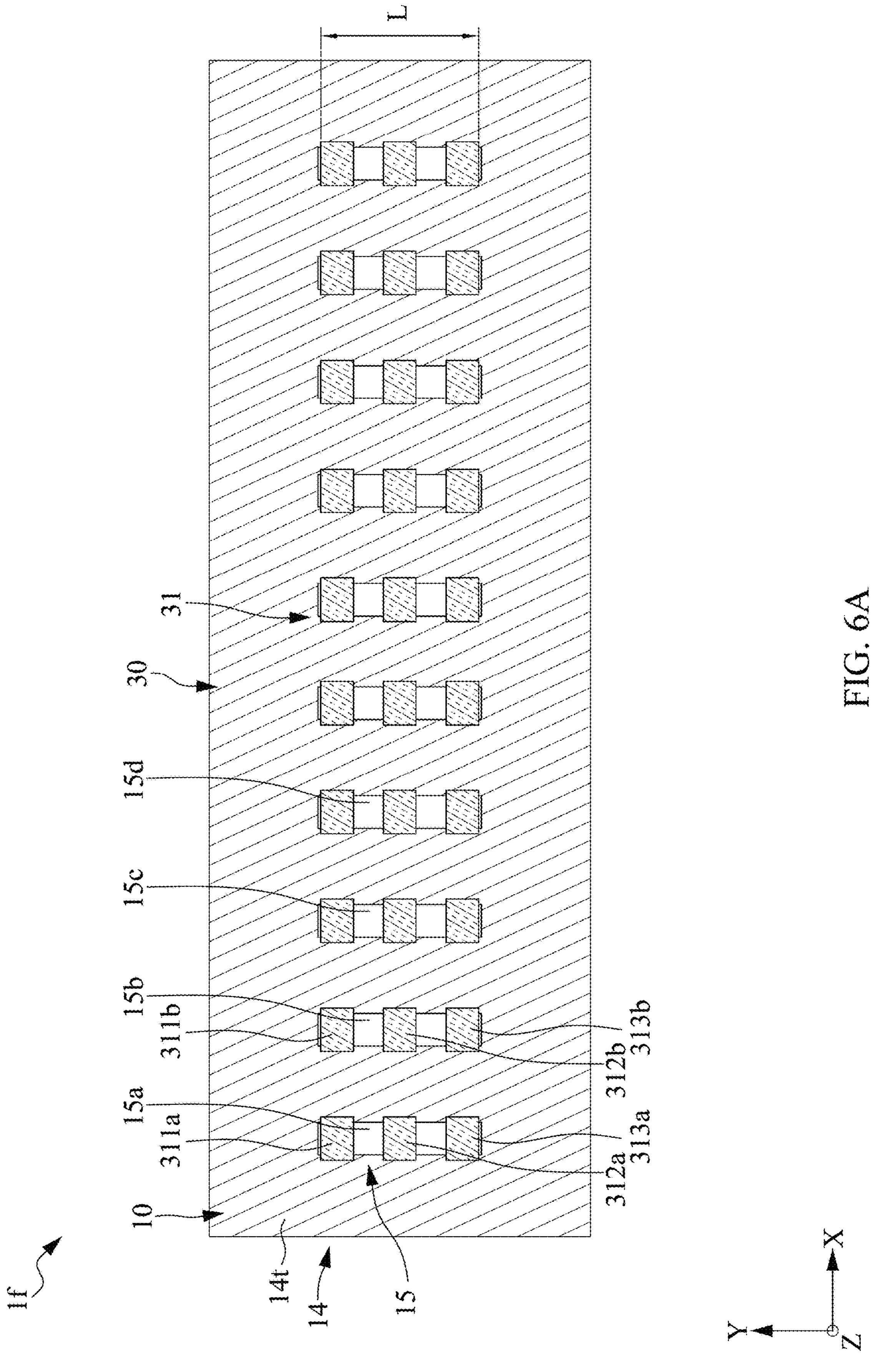
FIG. 6A is a top view of an electronic device, in accordance with an embodiment of the present disclosure.

FIG. 6A is a top view of an electronic device 1_f_, in accordance with an embodiment of the present disclosure. The electronic device 1_f_ is similar to the electronic device 1_a_ as shown in FIG. 1A, and the differences therebetween are described below. It should be noted that some elements, such as the conductive structure 32 as shown in FIG. 1B, are omitted for brevity.

In some embodiments, an equivalent length L along the Y direction of a slot 15 may be determined by multiple switches, which thereby tunes the frequency and/or the radiation pattern of an electromagnetic wave radiated from the electronic device 1_f_. In some embodiments, the electronic device If may include switch elements 311_a_, 312_a_, 313_a_, 311_b_, 312_b_, and 313_b_. In some embodiments, each of the switch elements 311_a_, 312_a_, 313_a_, 311_b_, 312_b_, and 313_b_ may include a diode(s), a transistor(s), or other suitable switches.

In some embodiments, the switch elements 311_a_, 312_a_, and 313_a_ may be disposed across the slots 15_a_. In some embodiments, the switch elements 311_b_, 312_b_, and 313_b_ may be disposed across the slot 15_b_. In some embodiments, the switch elements 311_a_, 312_a_, and 313_a_ may be configured to control, adjust, and/or modify the equivalent length L of the slots 15_a_. In some embodiments, the switch elements 311_b_, 312_b_, and 313_b_ may be configured to control, adjust, and/or modify the equivalent length L of the slot 15_b_. In some embodiments, the equivalent length L of the slot 15_a_ along the Y direction may be different from that of the slot 15_b_, depending on the operation of the switch elements 311_a_, 312_a_, 313_a_, 311_b_, 312_b_, and 313_b_. For example, when all switch elements 311_a_, 312_a_, and 313_a_ are in the off condition, the slot 15_a_ may have the maximum equivalent length and an electromagnetic wave may have a relatively low frequency. The frequency of the electromagnetic wave may be decreased by turning on at least one of the switch elements 311_a_, 312_a_, and 313_a_. For example, when the switch element 311_a_ is in the on condition, the equivalent length L of the slot 15_a_ may be reduced, and an electromagnetic wave may have a relatively high frequency. When the switch elements 311_a_ and 311_c_ are in the on condition, the equivalent length L of the slot 15_a_ may be further reduced, and the frequency of an electromagnetic wave from the signal transmission structure 10 may be increased.

Figure 6B:
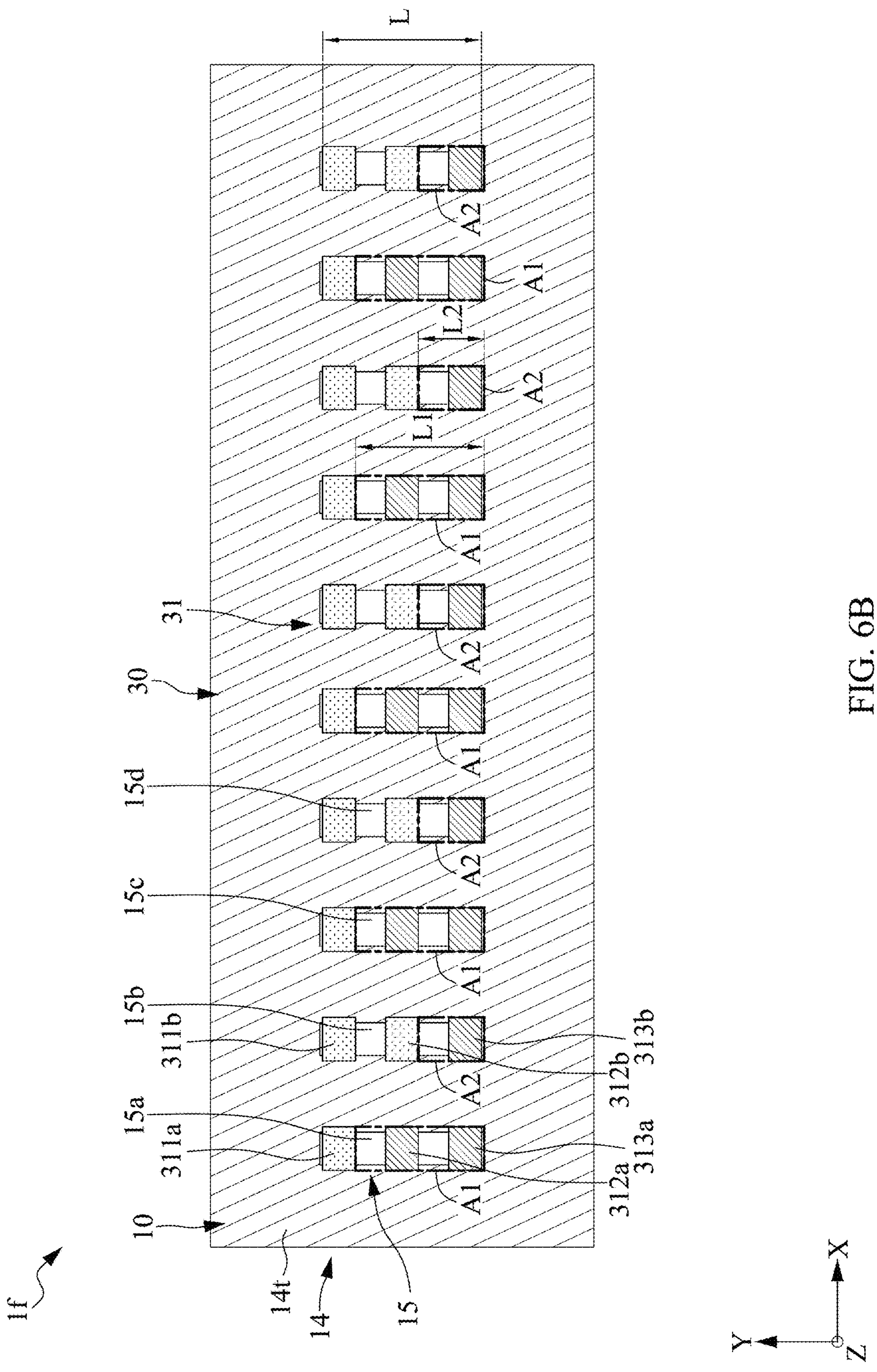
FIG. 6B is a schematic view illustrating an operation of the electronic device as shown in FIG. 6A, in accordance with an embodiment of the present disclosure.

FIG. 6B is a schematic view illustrating an operation of the electronic device If as shown in FIG. 6A, in accordance with an embodiment of the present disclosure.

As shown in FIG. 6B, the switch elements 31 in the on condition may have a dot pattern, and the switch elements 31 in the off condition may have a slash pattern. As shown in FIG. 6B, the switch elements 311_a_, 311_b_, and 312_b_ are in the on condition, and the switch elements 312_a_, 313_a_, and 313_b_ are in the off condition. The remaining switch elements 31 may be grouped and be switched as the pattern of the switch elements 311_a_, 312_a_, 313_a_, 311_b_, 312_b_, and 313_b_.

In some embodiments, the switch elements 31 may be configured to define apertures A1 and A2. The aperture A1 and/or A2 may be regarded as an imaginary region of an effective slot. In some embodiments, the geometric profile of the apertures A1 and A2 may be adjusted, controlled, or modified by the circuit 30. The geometric profile of the aperture A1 (or A2) may indicate an effective area, including effective length and effective width, of the slot 31. For example, when the switch element 311_a_ is in the on condition, the waveguide 14 may define the aperture A1, which has an equivalent length L1. When the switch elements 311_b_ and 312_b_ are in the on condition, the waveguide 14 may define the aperture A2, which has an equivalent length L2. The apertures A1 may be aligned with the apertures A2 along the X direction. The apertures A1 and A2 may have an array arrangement along the X direction. The apertures A1 and A2 may are alternatively arranged so that one of the apertures A2 may be disposed between abutting two apertures A1. The apertures A1 may be configured to radiate electromagnetic waves which form a constructive interference at a first frequency. The apertures A2 may be configured to radiate electromagnetic waves which form a constructive interference at a second frequency different from the first frequency. The slots 15 defining the aperture A1 may be regarded as a group, and the slots 15 defining the aperture A2 may be regarded as another group. When a frequency of an electromagnetic wave from the waveguide 14 is determined, the condition (in and on condition) of the switch elements 31 may be determined so that the distribution of the equivalent length L of each slots 15 (or aperture) may be determined. As a result, the distribution of the apertures (e.g., A1 and A2) may be obtained, and the distance or pitch of the apertures, having the same equivalent length L, may be obtained. For example, when a specific frequency of an electromagnetic wave radiated from the waveguide 14 is determined, the distribution of the apertures A1 and A2 with different equivalent lengths L1 and L2 may be obtained. In this condition, the distance (or pitch) between two abutting apertures A1 (or A2) can be calculated based on the frequency of the electromagnetic wave. In other conditions, three or more different apertures (or groups) may be defined based on the frequency of the electromagnetic wave.

Figure 6C:
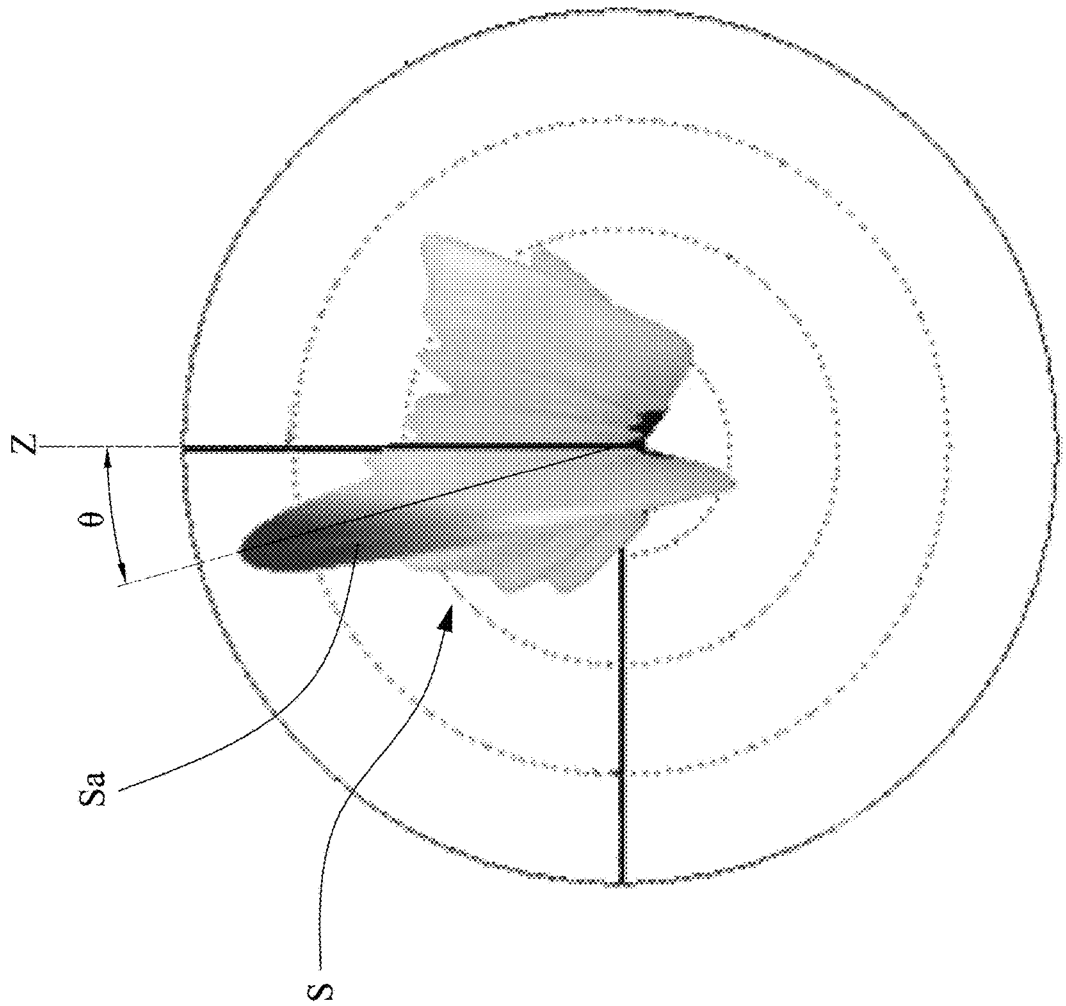
FIG. 6C is a schematic view illustrating an electromagnetic wave radiated from the electronic device as shown in FIG. 6B, in accordance with an embodiment of the present disclosure.

FIG. 6C is a schematic view illustrating an electromagnetic wave S radiated from the electronic device If as shown in FIG. 6B, in accordance with an embodiment of the present disclosure. The electromagnetic wave S may have a main lobe Sa. The main lobe Sa may be slanted with respect to the Z direction with an angle θ. In some cases, if all of the switch elements 31 are in the off condition, the main lobe of the electromagnetic wave may be substantially parallel to the Z direction. If some of switch elements 31 are in the on condition, the angle between the main lobe Sa and the Z direction may be changed. By adjusting the geometric profile (e.g., effective length, effective width, and/or effective area) of the apertures, the frequency (or operating frequency), the radiation pattern, and the transmission direction of the electromagnetic wave may be controlled.

In this embodiment, the equivalent length of the slots may be adjusted, modified, and controlled by the switch element 31, which may be configured to adjust, modify, and control the frequency and radiation pattern of an electromagnetic wave.

Figure 7:
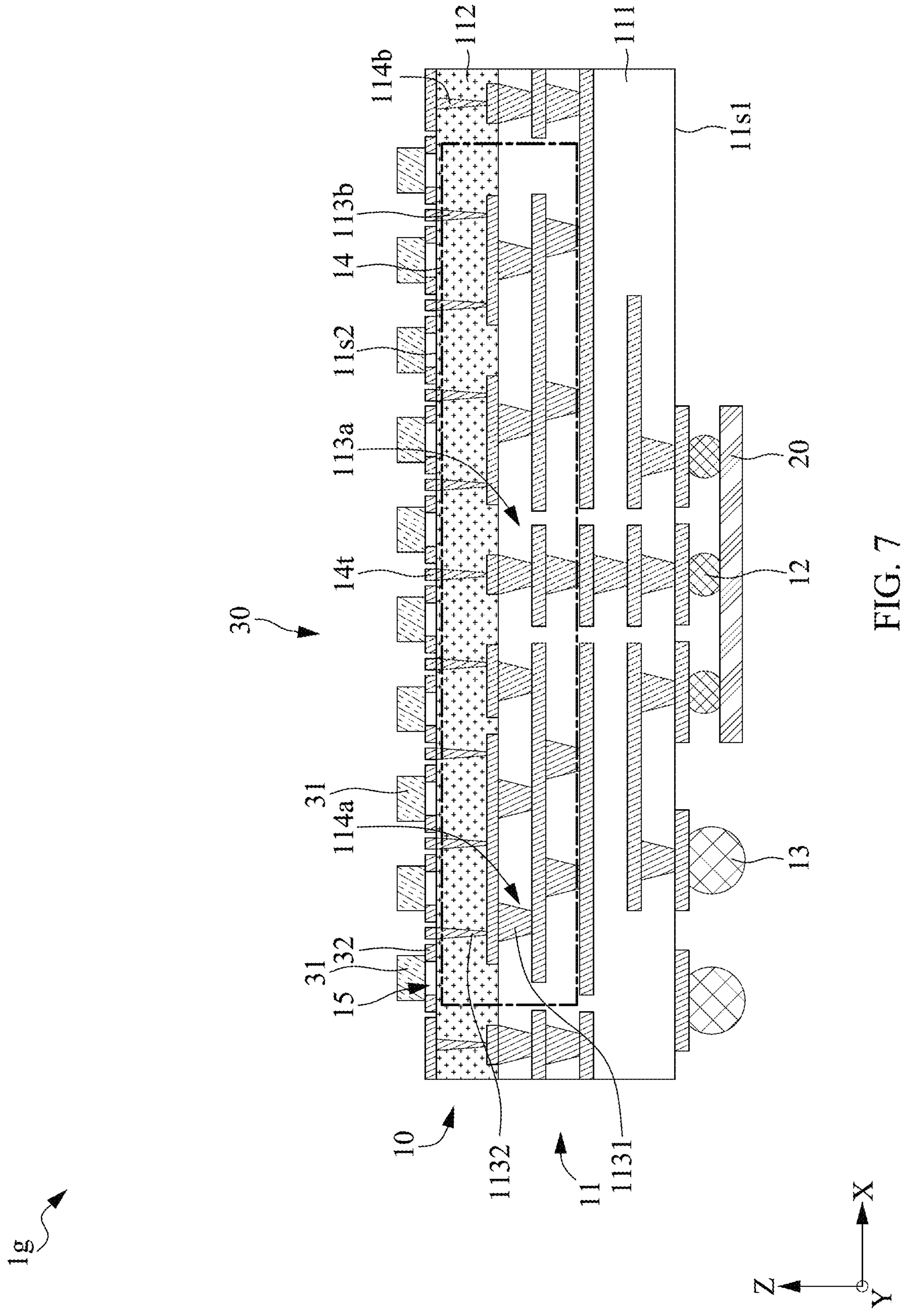
FIG. 7 is a cross-sectional view of an electronic device, in accordance with an embodiment of the present disclosure.

FIG. 7 is a cross-sectional view of an electronic device 1*g*, in accordance with an embodiment of the present disclosure. The electronic device 1*g* is similar to the electronic device 1*a* as shown in FIG. 1A, and the differences therebetween are described below.

In some embodiments, the electronic device 1*g* may include conductive vias 1131 and 1132. The conductive vias 1131 and 1132 may be configured to define the waveguide 14. The conductive vias 1131 and 1132 may function as ground vias which are electrically connected to ground. The dimension of the conductive via 1131 may be greater than the dimension of the conductive via 1132. In some embodiments, the density of the conductive vias 1132 may be greater than that of the conductive vias 1131. The conductive vias 1131 may be located within a low-density circuit structure. The conductive vias 1132 may be located within a high-density circuit structure.

Figure 8:
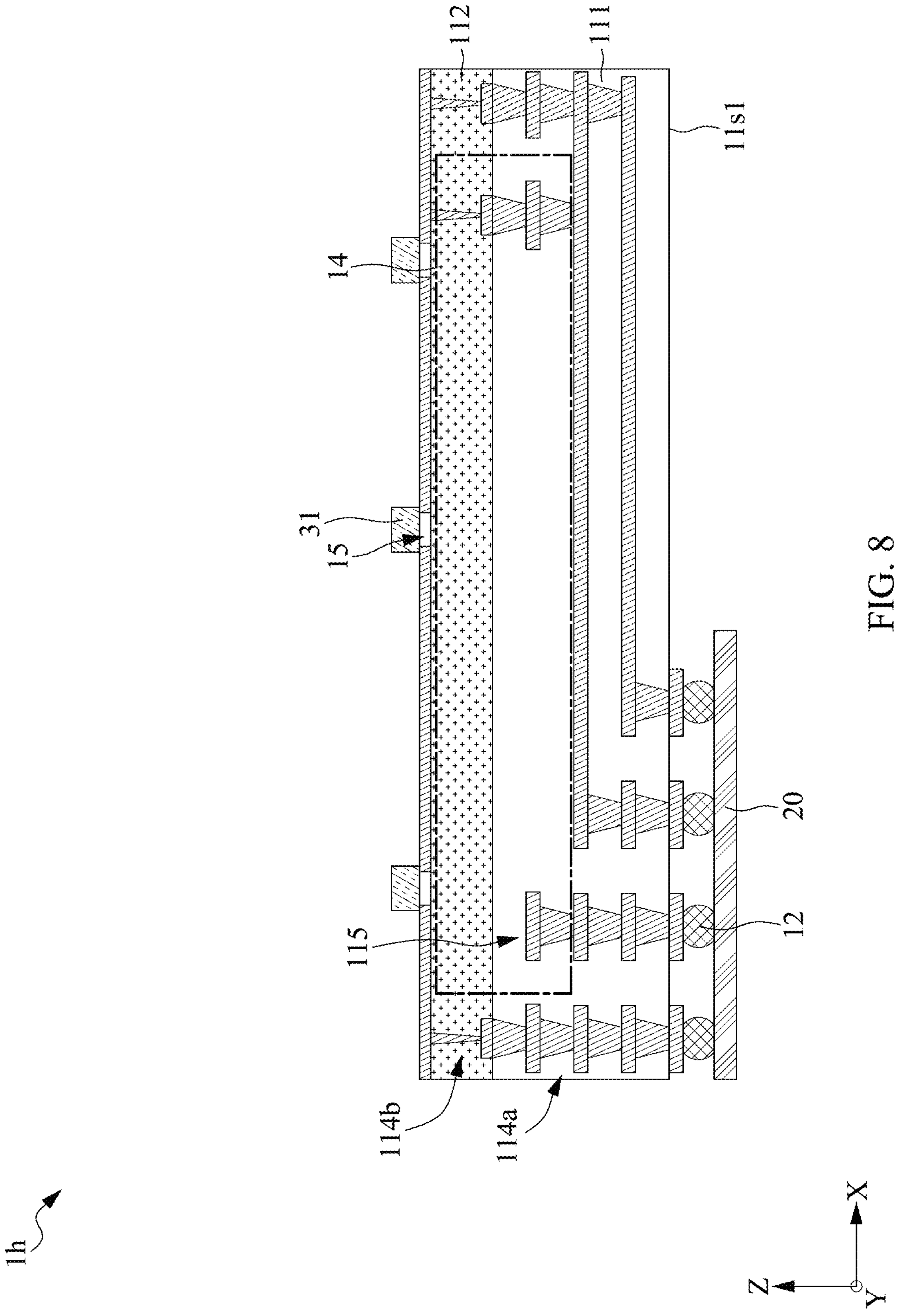
FIG. 8 is a cross-sectional view of an electronic device, in accordance with an embodiment of the present disclosure.

FIG. 8 is a cross-sectional view of an electronic device 1*h*, in accordance with an embodiment of the present disclosure. The electronic device 1*h* is similar to the electronic device 1*a* as shown in FIG. 1A, and the differences therebetween are described below.

The electronic device 1*h* may include a feed element 115. The feed element 115 may be configured to transmit a signal (e.g., feed signal) to the waveguide 14. The feed element 115 may be electrically connected to the electronic component 20. The feed element 115 may include conductive pad(s), trace(s), via(s), layer(s), or other interconnection(s). In some embodiments, the feed element 115 may be disposed within the dielectric structure 111. The topmost conductive element of the feed element 115 may be disposed within the dielectric structure 111.

Spatial descriptions, such as "above," "below," "up," "left," "right," "down," "top," "bottom," "vertical," "horizontal," "side," "higher," "lower," "upper," "over," "under," and so forth, are indicated with respect to the orientation shown in the figures unless otherwise specified. It should be understood that the spatial descriptions used herein are for purposes of illustration only and that practical implementations of the structures described herein can be spatially arranged in any orientation or manner, provided that the merits of arrangements of this disclosure are not deviated from by such an arrangement.

As used herein, the term "vertical" is used to refer to upward and downward directions, whereas the term "horizontal" refers to directions transverse to the vertical directions.

As used herein, the terms "approximately," "substantially," "substantial" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, a first numerical value can be deemed to be "substantially" the same or equal to a second numerical value if the first numerical value is within a range of variation of less than or equal to ±10% of the second numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" perpendicular can refer to a range of angular variation relative to 90° that is less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Two surfaces can be deemed to be coplanar or substantially coplanar if a displacement between the two surfaces is not exceeding 5 μm, not exceeding 2 μm, not exceeding 1 μm, or not exceeding 0.5 μm. A surface can be deemed to be substantially flat if a displacement between the highest point and the lowest point of the surface is not exceeding 5 μm, not exceeding 2 μm, not exceeding 1 μm, or not exceeding 0.5 μm.

As used herein, the singular terms "a," "an," and "the" may include plural referents unless the context clearly dictates otherwise.

As used herein, the terms "conductive," "electrically conductive" and "electrical conductivity" refer to an ability to transport an electric current. Electrically conductive materials typically indicate those materials that exhibit little or no opposition to the flow of an electric current. One measure of electrical conductivity is Siemens per meter (S/m). Typically, an electrically conductive material is one having a conductivity exceeding approximately 104 S/m, such as at least 105 S/m or at least 106 S/m. The electrical conductivity of a material can sometimes vary with temperature. Unless otherwise specified, the electrical conductivity of a material is measured at room temperature.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified.

While the present disclosure has been described and illustrated with reference to specific arrangements thereof, these descriptions and illustrations are not limiting. It should be understood by those skilled in the art that various changes may be made and equivalents may be substituted without departing from the true spirit and scope of the present disclosure as defined by the appended claims. The illustrations may not necessarily be drawn to scale. There may be distinctions between the artistic renditions in the present disclosure and the actual apparatus due to manufacturing processes and tolerances. There may be other arrangements of the present disclosure which are not specifically illustrated. The specification and drawings are to be regarded as illustrative rather than restrictive. Modifications may be made to adapt a particular situation, material, composition of matter, method, or process to the objective, spirit, and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations of the present disclosure.

What is claimed is:

1. An electronic device, comprising:

a signal transmission structure having a waveguide and a plurality of first slots configured to radiate an electromagnetic wave, wherein each of the plurality of first slots is adjustable by a circuit to control a radiation direction of the electromagnetic wave, wherein the circuit is configured to drive at least one of the plurality of first slots operating in an On or Off mode, the circuit comprises at least one switch element across the at least one of the plurality of first slots, and the switch element comprises at least one first diode configured to determine the On or Off mode of the at least one of the plurality of first slots by turning off or turning on the at least one first diode.

2. The electronic device of claim 1, wherein the signal transmission structure comprises at least one second slot, and the switch element comprises at least one second diode across the at least one second slot, and the circuit comprises a control element having a first terminal connected to the at least one of the plurality of first slots and a second terminal connected to the at least one second diode, and wherein the at least one second diode is turned off when the at least one of the plurality of first slots is turned on by the control element.

3. The electronic device of claim 1, wherein the at least one switch element is adjacent to the at least one of the plurality of first slots.

4. An electronic device, comprising:

a signal transmission structure having a waveguide and a plurality of first slots; and a circuit configured to control a distance between abutting two of the plurality of first slots to radiate a plurality of first electromagnetic waves to form a first constructive interference, wherein the signal transmission structure comprises a plurality of second slots, the plurality of second slots are disposed between the plurality of first slots and the waveguide, and the plurality of second slots are substantially aligned with the plurality of first slots.

5. The electronic device of claim 4, wherein the distance is a pitch of the plurality of first slots.

6. The electronic device of claim 4, wherein the signal transmission structure comprises a higher density circuit structure and a lower density circuit structure, and the higher density circuit structure and the lower density circuit structure collectively form the waveguide.

7. The electronic device of claim 6, wherein the plurality of first slots are disposed within the higher density circuit structure.

8. The electronic device of claim 7, wherein the circuit comprises at least one diode disposed over the higher density circuit structure and abutting one of the plurality of first slots, and the at least one diode is configured to drive the one of the plurality of first slots operating in an On or Off mode.

9. The electronic device of claim 8, wherein the signal transmission structure comprises a plurality of ground vias defining the waveguide and a plurality of signal vias disposed outside of the waveguide, and at least one of the plurality of signal vias is electrically connected to the at least one diode.

* * * * *